No. 612,009. Patented Oct. 11, 1898.
G. B. BALDO.
PROCESS OF AND APPARATUS FOR ELECTROLYZING SEA WATER.
(Application filed Oct. 5, 1896.)
(No Model.)
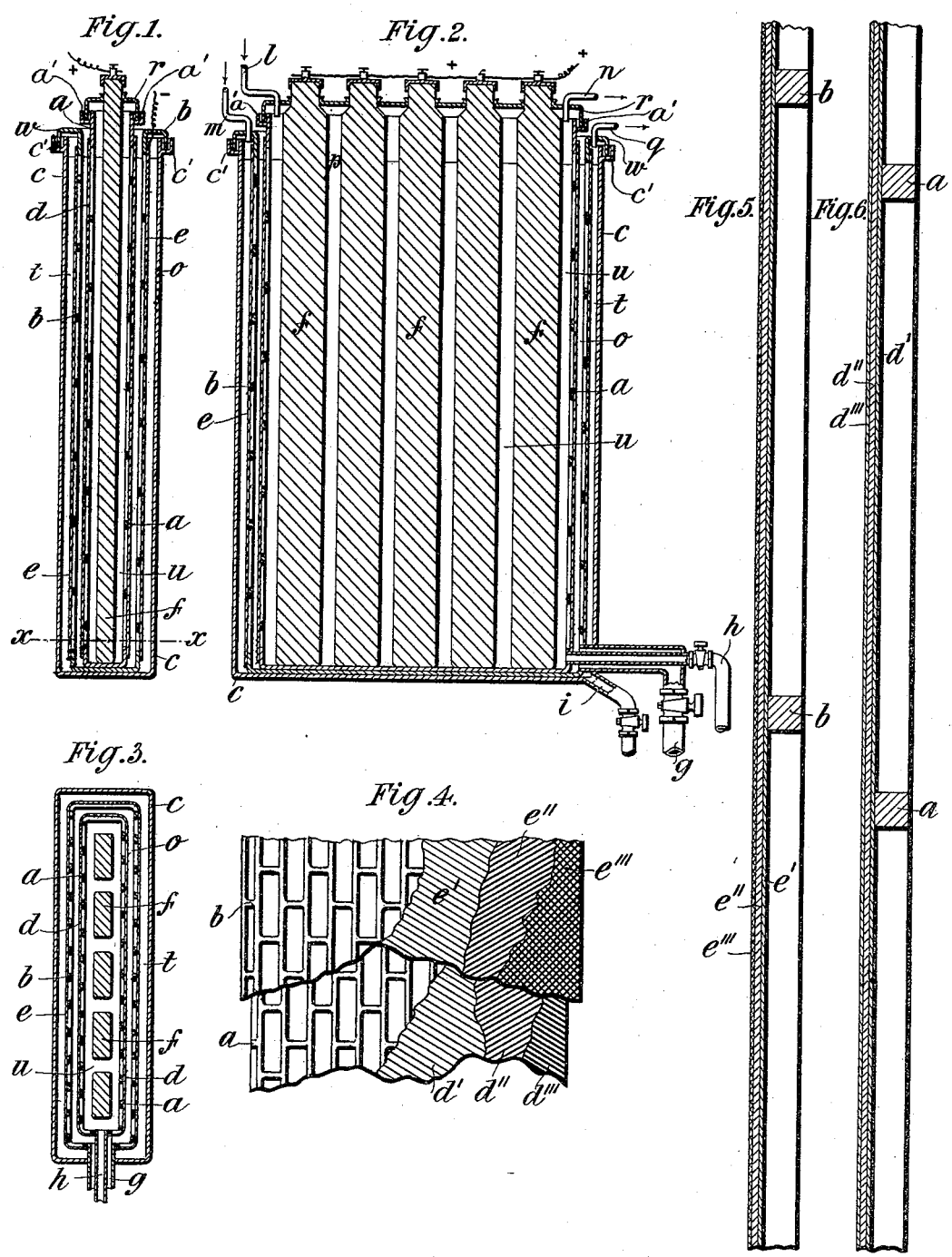
WITNESSES.
INVENTOR.
Giovanni B. Baldo

UNITED STATES PATENT OFFICE.

GIOVANNI BATTISTA BALDO, OF TRIEST, AUSTRIA-HUNGARY.

PROCESS OF AND APPARATUS FOR ELECTROLYZING SEA-WATER.

SPECIFICATION forming part of Letters Patent No. 612,009, dated October 11, 1898.

Application filed October 5, 1896. Serial No. 607,945. (No model.) Patented in England March 6, 1896, No. 5,098; in Austria April 6, 1896, No. 46/1,391, and in Belgium July 15, 1896, No. 122,372.

*To all whom it may concern:*

Be it known that I, GIOVANNI BATTISTA BALDO, a subject of the Emperor of Austria-Hungary, residing at Triest, in the Empire of Austria-Hungary, have invented a certain new and useful Improved Process of and Apparatus for Electrolysis, (for which I have obtained Letters Patent in Austria under date of April 6, 1896, No. 46/1,391, (in part;) in Great Britain under date of March 6, 1896, No. 5,098, and in Belgium under date of July 15, 1896, No. 122,372,) of which the following is a specification.

My invention relates to an improved process of and apparatus for the electrolysis of sea-water for the purpose of obtaining caustic soda, hydrogen, and chlorin and for the separation of the magnesium and calcium in the form of oxids from the electrolytes and the sulfuric acid and hydrochloric acid developed during the process, though the apparatus is adapted for the electrolytic decomposition of other liquids and substances.

The apparatus I employ is illustrated in the accompanying drawings, in which—

Figure 1 is a cross-section of a cell of same. Fig. 2 is a longitudinal section. Fig. 3 is a sectional plan on line $x\,x$, Fig. 1. Fig. 4 is an elevation, on a larger scale, broken in several places to show the two porous vessels hereinafter referred to. Figs. 5 and 6 are sections on a still larger scale of the walls of such porous vessels.

The cell consists of an outer vessel $c$, in which is supported a porous vessel $b\,e$, forming the cathode, inside of which is a second porous vessel $a\,d$, containing the anodes $f$, which are of carbon or other suitable material. The contents of the vessel $c$ may be drawn off through a pipe $i$ and the contents of the vessels $b\,e$ and $a\,d$ through pipes $g\,h$, respectively. The vessel $c$ has an inlet-pipe $m$ for liquid and an outlet-pipe $q$ for the gases, and the vessel $a\,d$ has an inlet $l$ for liquid and an outlet $n$ for the gases. The vessel $a\,d$ is closed by a cover $r$, the turned-down edge of which dips into a groove $a'$, and the vessel $c$ by a flange $w$, attached to or forming part of the vessel $b\,e$, the turned-down edge of which flange dips into a groove $c'$ of the vessel $c$.

The vessel $b\,e$ consists of an open or skeleton framework $b$, of earthenware or like material, which is covered with fabric, such as linen $e'$, surrounded in turn by a layer of asbestos board or the like $e''$ of about one millimeter in thickness, which again is surrounded and is in contact with an open-work metal sheet, such as close wire-netting $e'''$.

The vessel $a\,d$ consists of an earthenware framework $a$, covered with a layer of fabric, such as linen $d'$, a layer of asbestos board $d''$, and a further layer of linen $d'''$.

When electrolyzing sea-water, for instance, the sea-water may be placed in the space $u$ of the vessel $a\,d$ and in the space $o$ of the vessel $b\,e$, while the space $t$ of the vessel $c$ may contain fresh water. Upon a current being passed through the apparatus the sea-water in the two spaces $u$ and $o$ is decomposed, magnesium and calcium oxids being precipitated in the space $o$, while the sodium produced at the cathode $b\,e$ is oxidized by the fresh water in the space $t$ of the vessel $c$ and forms caustic soda, which, owing to its specific gravity, sinks down and may be drawn off through the pipe $i$. It may be remarked that the cathode vessel $b\,e$, as before described, is provided with a metallic network $e'''$, which is the metallic part of the cathode. The metallic substances or oxids are produced or separated at the cathode, the acids at the anode. In consequence the soluble soda in solution in the water passes through the porous vessel $b\,e$ and passes in solution to the metallic portion $e'''$ of the cathode. The magnesium and calcium which were also separated from the acids, being insoluble, cannot pass through the porous vessel $b\,e$ and so remain in the space $o$. The acids derived from this decomposition pass through the porous vessel $a\,d$ to the space $u$, in which the anode $f$ is situated, where they find the sea-water only partially decomposed, and in this space the sulfuric acid derived from the decomposition of the sea-water in the space $o$ acts on the chlorid of sodium and transforms it to hydrochloric acid and sulfate of sodium. The liquid in this space $u$, containing the hydrochloric acid formed, is afterward concentrated and distilled. As the electric current decomposes the sea-water in the space $o$ it also decomposes the water in the space $u$, and so a certain amount of chlorin is produced, which is utilized while the soluble soda passes through the two vessels $a$ $d$ and $b$ $e$ to the cathode-netting $e'''$. The magnesium and calcium decomposed in the space $u$ remain there not precipitated, but are dissolved by the excess of acids formed by the anode in this space. Chlorin gas is given off at the anode $f$ and hydrogen at the cathode $b$ $e$, the gases escaping through the pipes $n$ $q$, respectively, and being collected, if desired. The liquid remaining in the space $u$ contains free sulfuric acid produced by the decomposition of the sulfates of the sea-water, undecomposed chlorid of sodium, and some undecomposed sulfate of magnesium and other sulfates. This liquid is distilled, the vapor passing off being collected as hydrochloric acid, which may be added to that previously distilled.

If sea-water be left in space $o$ and in place of sea-water in the anode-space $u$ water acidulated with sulfuric acid is used, sulfuric acid and chlorin gas only are obtained in the space $u$, the space $o$ collecting the magnesium and calcium oxids and the space $t$ the caustic soda, as before.

Cells constructed as above described will be found to possess a minimum of internal resistance compared with many of the cells at present in use.

What I claim is—

1. The herein-described process of electrolyzing sea-water, which consists in decomposing two bodies of the same, at the anode and cathode respectively, in presence of a body of fresh water on the opposite side of the cathode to the sea-water, such bodies of sea-water and fresh being separated as against circulation, but not against the action of the current, precipitating magnesium and calcium hydrates at the cathode, while the sodium produced at the cathode is oxidized by the fresh water forming caustic soda therein.

2. The herein-described process of electrolyzing sea-water for the production of chlorin gas, hydrochloric acid, sulfuric acid, magnesium hydrate, calcium hydrate, caustic soda and hydrogen, which consists in decomposing two bodies of sea-water at the anode and cathode respectively, in presence of a body of fresh water on the opposite side of the cathode to the sea-water, such bodies of sea-water and fresh water being entirely separated against circulation, but not against the action of the current, chlorin gas being given off at the anode and magnesium and calcium hydrates being precipitated at the cathode, while the sodium produced at the cathode is oxidized by the fresh water and forms caustic soda therein, hydrogen being given off at such cathode, and subsequently vaporizing the liquid of the anode containing free sulfuric acid until only one-quarter of its original bulk remains, distilling this and collecting the vapor passing off as hydrochloric acid.

3. In an electrolytic cell and in combination a wall consisting of an open framework or grid of earthenware, a layer of linen secured to one side of same, a layer of asbestos board secured to the linen and an open-work metal sheet secured to the asbestos board the whole adapted to form a composite porous cathode-cell possessing a low internal resistance, substantially as described.

4. In an electrolytic cell, a wall consisting of an open framework or grid of earthenware, a layer of linen secured to the outside of the same, a layer of asbestos board secured to the linen and a further layer of linen secured to the asbestos board, the whole forming a composite porous cell, substantially as described.

In testimony whereof I have hereunto set my hand in the presence of two subscribing witnesses.

GIOVANNI BATTISTA BALDO.

Witnesses:
J. EDWARD NETTLES,
E. DANANZA.